United States Patent
Kaup

(10) Patent No.: US 8,111,748 B2
(45) Date of Patent: *Feb. 7, 2012

(54) METHOD AND APPARATUS FOR VIDEO CODING

(75) Inventor: Andre Kaup, Effeltrich (DE)

(73) Assignee: Siemens Aktiengesellschaft, Munich (DE)

( * ) Notice: Subject to any disclaimer, the term of this patent is extended or adjusted under 35 U.S.C. 154(b) by 248 days.

This patent is subject to a terminal disclaimer.

(21) Appl. No.: 12/458,669

(22) Filed: Jul. 20, 2009

(65) Prior Publication Data

US 2009/0279607 A1   Nov. 12, 2009

Related U.S. Application Data

(63) Continuation of application No. 10/216,647, filed on Aug. 12, 2002, now Pat. No. 7,580,458.

(30) Foreign Application Priority Data

Jun. 7, 2002   (DE) .................................. 102 25 434

(51) Int. Cl.
*H04B 1/66* (2006.01)
(52) U.S. Cl. ......... 375/240.03; 375/240.12; 375/240.13; 375/240.24; 375/240.02; 382/238; 382/236; 382/251; 382/239; 382/235
(58) Field of Classification Search ............ 375/240.03, 375/240.12, 240.13, 240.24, 240.02; 382/238, 382/236, 251, 239, 235
See application file for complete search history.

(56) References Cited

U.S. PATENT DOCUMENTS

| 4,853,780 | A | | 8/1989 | Kojima et al. |
| 5,151,784 | A | * | 9/1992 | Lavagetto et al. ........ 375/240.12 |
| 5,321,440 | A | * | 6/1994 | Yanagihara et al. ........ 375/240.2 |
| 5,418,569 | A | * | 5/1995 | Ando ........................ 375/240.04 |
| 5,589,885 | A | | 12/1996 | Ooi |
| 5,911,008 | A | * | 6/1999 | Niikura et al. ................. 382/236 |
| 6,195,389 | B1 | * | 2/2001 | Rodriguez et al. ........ 375/240.16 |
| 6,275,535 | B1 | | 8/2001 | Bramley |
| 6,359,929 | B1 | | 3/2002 | Boon |
| 7,580,458 | B2 | * | 8/2009 | Kaup ........................ 375/240.03 |

FOREIGN PATENT DOCUMENTS

WO   WO 9521503   8/1995

OTHER PUBLICATIONS

"Joint Committee Draft (CD)", Joint Video Team (JVT) of ISO/IEC MPEG and ITU-T VCEG, May 10, 2002.
U.S. Office Action dated Sep. 14, 2005, issued in corresponding Parent Application, U.S. Appl. No. 10/216,647.
U.S. Office Action dated May 16, 2006, issued in corresponding Parent Application, U.S. Appl. No. 10/216,647.

(Continued)

*Primary Examiner* — Shawn An
(74) *Attorney, Agent, or Firm* — Staas & Halsey LLP

(57) ABSTRACT

In uniform superposition of two predictions toward a weighted superposition, such as in coding B frames, weighting is based on reliability of a reference picture used for determination of the prediction. Since there is a relationship between the reliability and the respective quantization parameter, coupling to the quantization parameter that is also known in the receiver also can be effected advantageously.

4 Claims, 2 Drawing Sheets

OTHER PUBLICATIONS

U.S. Office Action dated Oct. 24, 2006, issued in corresponding Parent Application, U.S. Appl. No. 10/216,647.

U.S. Office Action dated Aug. 15, 2008, issued in corresponding Parent Application, U.S. Appl. No. 10/216,647.

U.S. Office Action dated Dec. 31, 2008, issued in corresponding Parent Application, U.S. Appl. No. 10/216,647.

Notice of Allowability dated Apr. 20, 2009, issued in corresponding Parent Application, U.S. Appl. No. 10/216,647.

U.S. Patent Office Communication dated Aug. 9, 2007, issued in corresponding Parent Application, U.S. Appl. No. 10/216,647.

U.S. Appl. No. 10/216,647, filed Aug. 12, 2002, Andre Kaup.

* cited by examiner

METHOD AND APPARATUS FOR VIDEO CODING

CROSS REFERENCE TO RELATED APPLICATIONS

This application is a divisional of U.S. patent application Ser. No. 10/216,647, filed Aug. 12, 2002, now U.S. Pat. No. 7,580,458, and is based on and hereby claims priority to German Application No. 102 254 34.6 filed on Jun. 7, 2002, the contents of which are hereby incorporated by reference.

BACKGROUND OF THE INVENTION

1. Field of the Invention

The invention relates to a method and an apparatus for video coding, in which a predicted picture is produced by averaging reference pictures.

2. Description of the Related Art

Digital video data are generally compressed for storage or transmission, to significantly reduce the enormous volume of data. The compression is effected both by eliminating the signal redundancy contained in the video data and by eliminating the irrelevant signal parts that are imperceptible to the human eye. This is generally achieved by a hybrid coding method in which the picture to be coded is firstly predicted temporally and the remaining prediction error is subsequently transformed into the frequency domain, for example by a discrete cosine transformation, and is quantized there and coded by a variable length code. The motion information and the quantized spectral coefficients are finally transmitted.

The performance of the hybrid coding method depends very significantly on the quality of the temporal prediction. The better this prediction of the next picture information to be transmitted, the smaller the prediction error that remains after the prediction, and the lower the data rate that has to be subsequently expended for the coding of this error. A significant task in the compression of video data is obtaining the most exact prediction possible of the picture to be coded from the picture information that has already been transmitted beforehand.

The prediction of a picture has been effected heretofore by firstly dividing the picture into regular portions, typically square blocks with a size of 8×8 or 16×16 pixels, and subsequently determining, for each of these picture blocks, a prediction from the picture information already known in the receiver, by motion compensation. In this context, it is possible to distinguish between two basic cases of prediction:

unidirectional prediction: in this case, the motion compensation is effected exclusively on the basis of the previously transmitted picture and leads to so-called "P frames".

bidirectional prediction: the picture is predicted by superposition of two pictures, of which one is temporally preceding and another is temporally succeeding and which leads to so-called "B frames". It should be taken into consideration here that both reference pictures have already been transmitted.

In the last-mentioned case, the actual prediction value must be calculated by averaging from both reference pictures. In the previously standardized method MPEG-1 to MPEG-4 or H.263, an equal-weight averaging is always carried out for this purpose, that is to say that the two possible predictions are added and the resulting sum is then halved.

SUMMARY OF THE INVENTION

An object of the invention is to provide video coding in which the total data rate required for the coding of the picture becomes as small as possible.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
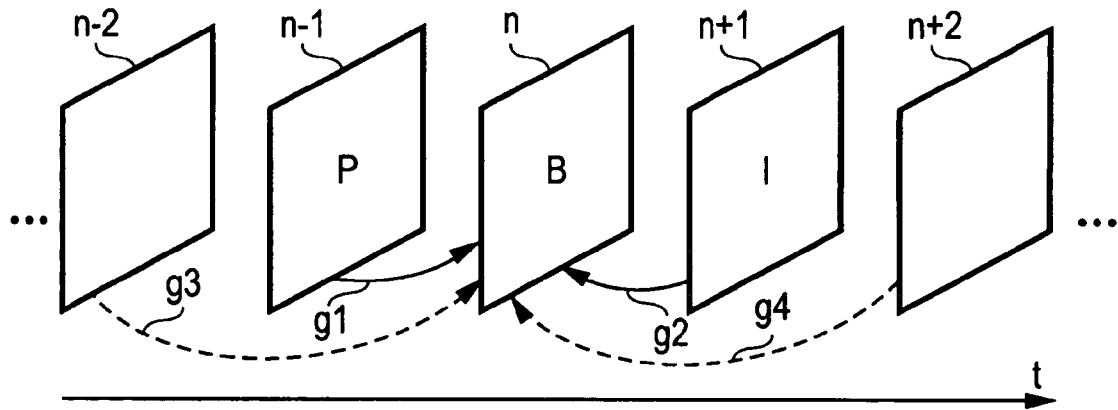
FIG. 1 is time diagram of a picture sequence illustrating prediction according to the invention.

Reference will now be made in detail to the preferred embodiments of the present invention, examples of which are illustrated in the accompanying drawings, wherein like reference numerals refer to like elements throughout.

The invention essentially resides in a generalization of the uniform superposition—known from the coding of B frames—of two predictions toward a weighted superposition. In this case, the weighting is coupled e.g. to the reliability of the reference picture used for the determination of the prediction. Since there is a relationship between the reliability and the respective quantization parameter, coupling to the quantization parameter that is also known in the receiver can advantageously also be effected.

Figure 3:
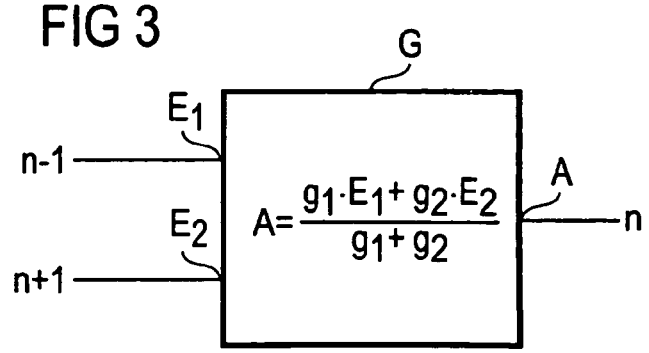
FIG. 3 is a block diagram for elucidating the apparatus according to the invention.

FIG. 1 illustrates a picture sequence . . . n−2, n−1, n, n+1, n+2 . . . in a time t. In this case, the picture n+1 is e.g. a pure intraframe-coded picture, that is to say a so-called I frame, and the picture n−1 is, for example, a predictively coded reference picture, that is to say a so-called P frame. Situated between the two pictures n−1 and n+1 is a picture generated by bi-directional prediction, that is to say a so-called B frame. For the case where two or more possible predictions are available, here the weights g1, g2, g3, g4 . . . are not necessarily chosen to be identical, but rather are determined in such a way that the best possible overall prediction is effected. This means that a uniform weighting for two reference pictures is not necessarily performed, rather, as indicated in the block diagram of FIG. 3, each of the for example two reference pictures is multiplied by a weighting factor g1 or g2, respectively, and the two products are added. The result is then divided by the sum of the two weighting factors g1 and g2.

In the simplest case, this can be achieved by a pure intraframe-coded picture n+1 obtaining a higher weight g2 than a predictively coded reference picture n−1 with the weight g1, since intraframe-coded pictures generally have a significantly better quality than predicted pictures.

By way of example, the weight of I frames may be $g2=\frac{2}{3}$ and the weight of P frames $g1=\frac{1}{3}$. In this case, these weighting factors must be transmitted from the transmitter to the receiver as additional page information. However, since the quality of the resulting overall prediction is significantly improved by the adaptation with variable weighting factors, the disadvantage of the page information that is to be additionally transmitted is more than compensated for by the saving in the transmission of the prediction error.

In order to avoid the transmission of the weighting factors and at the same time also to reduce the complexity in the case of a free choice of factors at the transmitter end, the determination of the weight factors can also be further formalized. An advantageous refinement is the fact that the factors are inversely coupled to the level width of the quantizers used for the coding of the reference pictures. In concrete terms, this means that a block from a reference picture obtains a high weighting when this reference block has been coded with a low quantization level, that is to say a high quantization accuracy, and vice versa. The justification for this coupling is grounded in the fact that a large quantization level width or a low quantization accuracy is also associated with a correspondingly poor picture quality and thus a low reliability as reference picture. Since the quantization levels used for each block are transmitted anyway and are thus known to the receiver, it is possible to directly calculate the weighting factors for the superposition of the two individual predictions.

Figure 2:
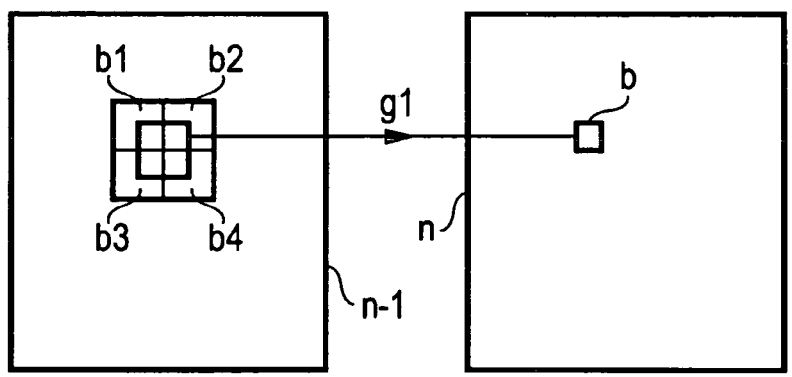
FIG. 2 a plan view illustrating two successive pictures for explaining a superposition of blocks that occurs during the prediction.

FIG. 2 illustrates a block b within the picture n and also four adjacent blocks b1 . . . b4 in the predecessor picture n−1. This makes it clear that the block b used for the prediction generally simultaneously superposes a plurality of coded individual blocks in the reference picture n−1 and further definition of the quantization level to be used is necessary, since, in the general case, the blocks b1 . . . b4 may each have different quantization levels. In this case, the weighting factor g1 can be determined from averaging from the quantization levels for the blocks b1 . . . b4 or, for example, by ascertaining the largest quantization level of the quantizers for these blocks.

During the prediction with the aid of weighted averaging, use is made of at least two reference pictures whose temporal position in the picture sequence is totally arbitrary, in principle, in which case either at least one reference picture can precede and at least one reference picture can temporally succeed the predicted picture n or, alternatively, either all reference pictures can temporally precede or all reference pictures can temporally succeed the predicted picture.

Figure 4:
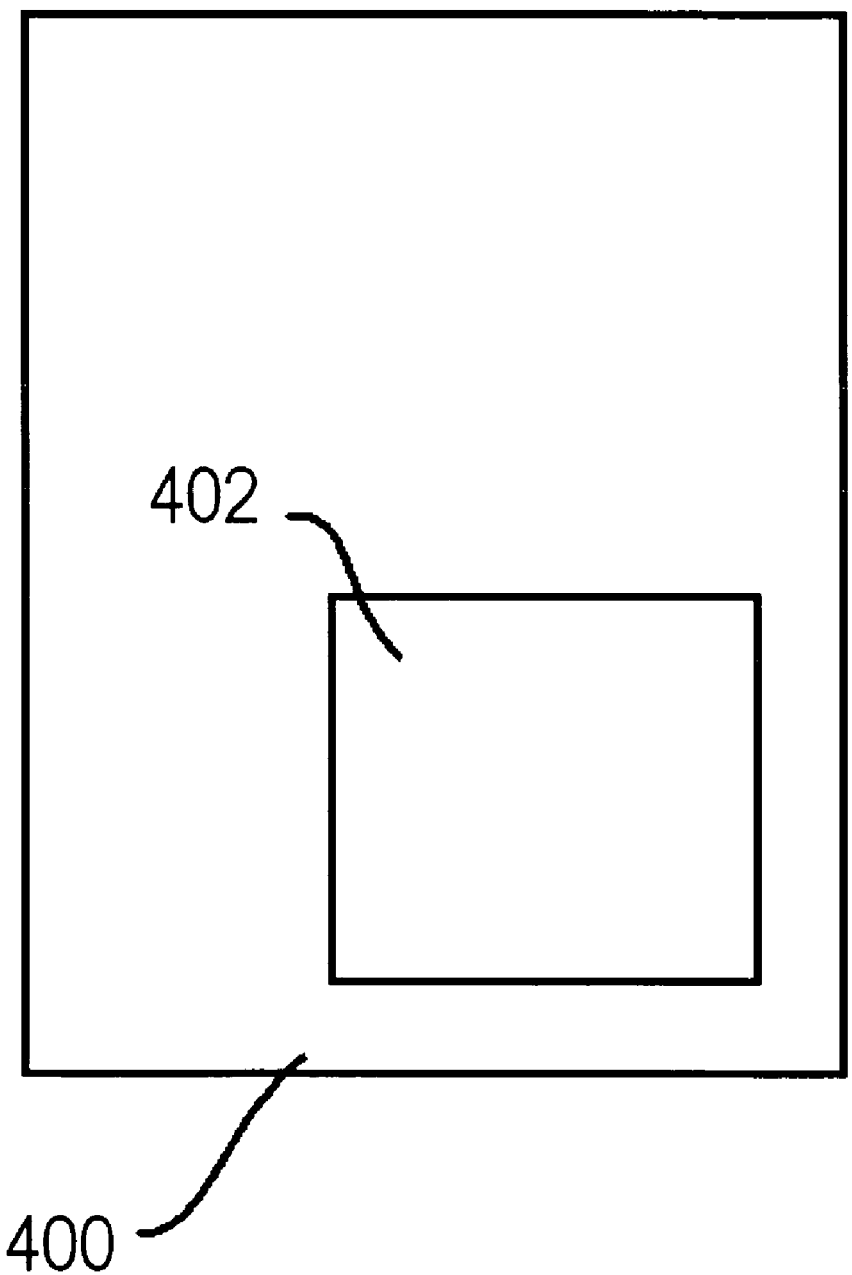
FIG. 4 is a schematic of a computer readable medium storing a program embodying a method for video coding according to an embodiment of the invention.

FIG. 4 shows a schematic of a computer readable medium 400 storing a program 402 embodying a method for video coding according to an embodiment of the invention.

The invention has been described in detail with particular reference to preferred embodiments thereof and examples, but it will be understood that variations and modifications can be effected within the spirit and scope of the invention.

What is claimed is:

1. A method for video coding, comprising:
assigning different weights to at least two reference pictures situated in an arbitrary temporal position before or after at least one predicted picture of a picture sequence; and
calculating the at least one predicted picture by weighted averaging of the at least two reference pictures;
wherein said assigning comprises selecting the different weights based on respective reliability of the reference pictures for prediction,
further comprising dividing the at least one predicted picture into at least two blocks,
wherein said assigning includes forming weighting factors inversely based on quantization level width per block of quantizers used for coding of the reference pictures;
wherein a block used for prediction simultaneously superposes a plurality of coded individual blocks in a respective reference picture, and
wherein said assigning includes forming a weight of the block used for the prediction either from an inverse average value of the quantization level width of individual blocks or inversely with respect to a largest value of quantization levels.

2. A method for video coding, comprising:
assigning different weights to at least two reference pictures situated in an arbitrary temporal position before or after at least one predicted picture of a picture sequence; and
calculating the at least one predicted picture by weighted averaging of the at least two reference pictures;
wherein said assigning comprises selecting the different weights based on respective reliability of the reference pictures for prediction,
wherein said assigning weights a purely intraframe coded reference picture more highly than a predictively coded reference picture;
further comprising dividing the at least one predicted picture into at least two blocks,
wherein said assigning includes forming weighting factors inversely based on quantization level width per block of quantizers used for coding of the reference pictures;
wherein a block used for prediction simultaneously superposes a plurality of coded individual blocks in a respective reference picture, and
wherein said assigning includes forming a weight of the block used for the prediction either from an inverse average value of the quantization level width of individual blocks or inversely with respect to a largest value of quantization levels.

3. A method for video coding, comprising:
assigning different weights to at least two reference pictures situated in an arbitrary temporal position before or after at least one predicted picture of a picture sequence; and
calculating the at least one predicted picture by weighted averaging of the at least two reference pictures;
wherein said assigning comprises selecting the different weights based on respective reliability of the reference pictures for prediction,
further comprising dividing the at least one predicted picture into at least two blocks,
wherein said assigning includes forming weighting factors inversely based on quantization level width per block of quantizers used for coding of the reference pictures,
wherein a block used for prediction simultaneously superposes a plurality of coded individual blocks in a respective reference picture, and
wherein said assigning includes forming a weight of the block used for the prediction either from an inverse average value of the quantization level width of individual blocks or inversely with respect to a largest value of quantization levels.

4. The method for video coding of claim 3, wherein the different weights are selected from the group consisting of:
⅓, and
⅔.

* * * * *